United States Patent
Ross et al.

(10) Patent No.: US 11,727,499 B1
(45) Date of Patent: Aug. 15, 2023

(54) METHOD OF EVALUATING HEURISTICS OUTCOME IN THE UNDERWRITING PROCESS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 17/816,903

(22) Filed: Aug. 2, 2022

Related U.S. Application Data

(63) Continuation of application No. 16/556,417, filed on Aug. 30, 2019, now Pat. No. 11,403,711, which is a continuation-in-part of application No. 15/885,644, filed on Jan. 31, 2018, now abandoned, which is a continuation of application No. 14/576,836, filed on Dec. 19, 2014, now Pat. No. 9,892,462.

(60) Provisional application No. 61/920,104, filed on Dec. 23, 2013.

(51) Int. Cl.
*G06Q 40/08* (2012.01)
(52) U.S. Cl.
CPC .................................. *G06Q 40/08* (2013.01)
(58) Field of Classification Search
CPC .................................................. G06Q 40/08
USPC ............................................................ 705/4
See application file for complete search history.

(56) References Cited

U.S. PATENT DOCUMENTS

| | | | |
|---|---|---|---|
| 5,067,099 | A | 11/1991 | Mccown et al. |
| 5,270,425 | A | 12/1993 | Vanwert et al. |
| 5,331,579 | A | 7/1994 | Maguire et al. |
| 5,523,942 | A | 6/1996 | Tyler et al. |
| 5,724,262 | A | 3/1998 | Ghahramani |
| 5,787,235 | A | 7/1998 | Smith et al. |
| 5,809,478 | A | 9/1998 | Greco et al. |
| 5,970,464 | A | 10/1999 | Apte et al. |
| 6,154,725 | A | 11/2000 | Donner |
| 6,456,979 | B1 | 9/2002 | Flagg |
| 6,542,905 | B1 | 4/2003 | Fogel et al. |
| 6,549,815 | B1 | 4/2003 | Kaji |
| 7,006,992 | B1 | 2/2006 | Packwood |
| 7,072,841 | B1 | 7/2006 | Pednault |

(Continued)

FOREIGN PATENT DOCUMENTS

CA 2441810 A1 9/2001

OTHER PUBLICATIONS

Aggour et al., "Automating the Underwriting of Insurance Applications", AI Magazine, 27, Fall 2006, pp. 36-50.

(Continued)

*Primary Examiner* — Cho Kwong
(74) *Attorney, Agent, or Firm* — Foley & Lardner LLP

(57) ABSTRACT

Systems and methods for validating outputs from a machine learning model is disclosed. The machine learning model and a statistical model are executed to generate electronic documents in response to customer requests. A random sample of electronic documents generated from the machine learning model and the statistical model are then selected. A comparison is performed between the random sample of electronic documents generated from the machine learning model and the statistical model. The performance of the machine learning model is validated based on results of the comparison.

20 Claims, 8 Drawing Sheets

(56) References Cited

U.S. PATENT DOCUMENTS

| | | |
|---|---|---|
| 7,287,008 B1 | 10/2007 | Mahoney et al. |
| 7,831,451 B1 | 11/2010 | Morse et al. |
| 7,895,062 B2 | 2/2011 | Bonissone et al. |
| 7,899,688 B2 | 3/2011 | Bonissone et al. |
| 8,515,783 B1 | 8/2013 | Weeks |
| 8,793,146 B2 | 7/2014 | Bonissone et al. |
| 8,838,498 B2 | 9/2014 | Ross |
| 2001/0027519 A1 | 10/2001 | Gudbjartsson et al. |
| 2002/0029158 A1 | 3/2002 | Wolff et al. |
| 2002/0116309 A1 | 8/2002 | Keyes et al. |
| 2002/0138310 A1 | 9/2002 | Sagalow |
| 2003/0018608 A1 | 1/2003 | Rice et al. |
| 2003/0088493 A1 | 5/2003 | Larsen et al. |
| 2003/0182159 A1 | 9/2003 | Bonissone et al. |
| 2003/0187700 A1 | 10/2003 | Bonissone et al. |
| 2003/0187768 A1 | 10/2003 | Ryan et al. |
| 2003/0212667 A1 | 11/2003 | Andersch et al. |
| 2003/0225605 A1 | 12/2003 | Yokota et al. |
| 2004/0039610 A1 | 2/2004 | Weitermann et al. |
| 2004/0128262 A1 | 7/2004 | Nafousi |
| 2004/0133439 A1 | 7/2004 | Noetzold et al. |
| 2004/0220840 A1 | 11/2004 | Bonissone et al. |
| 2005/0055296 A1 | 3/2005 | Hattersley et al. |
| 2005/0065754 A1 | 3/2005 | Schaf et al. |
| 2005/0108062 A1 | 5/2005 | Higgins |
| 2005/0246260 A1 | 11/2005 | Hodgdon et al. |
| 2005/0273370 A1 | 12/2005 | Udell et al. |
| 2005/0278198 A1 | 12/2005 | Huxol et al. |
| 2006/0095521 A1 | 5/2006 | Patinkin |
| 2006/0100912 A1 | 5/2006 | Kumar et al. |
| 2006/0112111 A1 | 5/2006 | Tseng et al. |
| 2006/0155699 A1 | 7/2006 | Purvis et al. |
| 2006/0247956 A1 | 11/2006 | Rosen et al. |
| 2006/0270918 A1 | 11/2006 | Stupp et al. |
| 2007/0005401 A1 | 1/2007 | Vinyard |
| 2007/0016542 A1 | 1/2007 | Rosauer et al. |
| 2007/0027725 A1 | 2/2007 | Dirnberger et al. |
| 2008/0000969 A1 | 1/2008 | Salomonsen et al. |
| 2009/0070188 A1 | 3/2009 | Scott et al. |
| 2009/0299911 A1 | 12/2009 | Abrahams et al. |
| 2010/0010935 A1 | 1/2010 | Shelton |
| 2010/0017234 A1 | 1/2010 | Stephens et al. |
| 2010/0114741 A1 | 5/2010 | Adama et al. |
| 2010/0185534 A1 | 7/2010 | Satyavolu et al. |
| 2011/0010367 A1 | 1/2011 | Jockish et al. |
| 2011/0040582 A1 | 2/2011 | Mullins |
| 2011/0066454 A1 | 3/2011 | Rosauer et al. |
| 2011/0191129 A1 | 8/2011 | Moriya |
| 2011/0246268 A1 | 10/2011 | Satyavolu et al. |
| 2011/0246280 A1 | 10/2011 | Satyavolu et al. |
| 2011/0246292 A1 | 10/2011 | Satyavolu et al. |
| 2011/0246346 A1 | 10/2011 | Satyavolu et al. |
| 2012/0004968 A1 | 1/2012 | Satyavolu et al. |
| 2012/0078913 A1 | 3/2012 | Muni et al. |
| 2012/0221485 A1 | 8/2012 | Leidner et al. |
| 2012/0226725 A1 | 9/2012 | Yang |
| 2012/0296676 A1 | 11/2012 | Burgoon et al. |
| 2013/0060582 A1 | 3/2013 | Cutino et al. |
| 2013/0332204 A1 | 12/2013 | Fiori et al. |
| 2014/0040172 A1 | 2/2014 | Ling et al. |
| 2014/0108277 A1 | 4/2014 | Dresner et al. |
| 2014/0195412 A1 | 7/2014 | Metz et al. |
| 2014/0226855 A1 | 8/2014 | Savvides et al. |
| 2014/0379386 A1 | 12/2014 | Drennan, III |
| 2015/0081319 A1 | 3/2015 | Kemp et al. |
| 2015/0095415 A1 | 4/2015 | White et al. |
| 2015/0205825 A1 | 7/2015 | Sengupta et al. |
| 2016/0057246 A1 | 2/2016 | Krishnaiahsetty |
| 2016/0110442 A1 | 4/2016 | Williams et al. |

OTHER PUBLICATIONS

Bonissone et al., "Evolutionary Optimization of Fuzzy Decision Systems for Automated Insurance Underwriting", Proc. FUZZ-IEEE 2002, Honolulu, HI, May 2002, pp. 1003-1008.

Collins et al., "An Application of a Multiple Neural Network Learning System to Emulation of Mortgage Underwriting Judgements", Proceedings of the IEEE International Conference on Neural Networks, 1988, pp. 11-459 through 11-466.

Hedberg, "Is AI going mainstream at last? a look inside Microsoft Research", entire document pertinent, Published in IEEE Intelligent Systems and their Applications, vol. 13, Issue 2, Mar. 1, 1998. 5 pages.

Romanycia et al., "What is a heuristic?", 2012 entire document pertinent, retrieved from hllps://web.archive.org/web/20120127125955/http://www.sfu.ca/-jeffpell/papers/RomanyciaPelletierHeuristics85.pdf, 2012, 12 pages.

Stobie et al., "Artificial Intteligence At Countrywide", entire document pertinent, Publisher IEEE, 1996, retrieved from https://ieeexplore.ieee.org/documenl/554546/authors#authors, 1996, 5 pages.

Yan et al., "Designing a Neural Network Decision System for Automated Insurance Underwriting", 2006 International Joint Conference on Neural Networks, Jul. 2006, pp. 2106-2113.

METHOD OF EVALUATING HEURISTICS OUTCOME IN THE UNDERWRITING PROCESS

CROSS-REFERENCE TO RELATED APPLICATIONS

This application is a continuation of U.S. patent application Ser. No. 16/556,417, filed Aug. 30, 2019, which is a continuation-in-part of U.S. application Ser. No. 15/885,644, filed Jan. 31, 2018, which is a continuation of U.S. Ser. No. 14/576,836, filed Dec. 19, 2014, which claims priority to the U.S. Provisional Application No. 61/920,104, filed on Dec. 23, 2013, all of which are hereby incorporated herein by reference in its entirety.

TECHNICAL FIELD

This application generally relates to data model evaluation systems, and more specifically relates to methods and systems for generating and evaluating outputs of machine learning models and statistical models.

BACKGROUND

Data processing, particular for financial services such as underwriting, should be accurate, fast, and consistent. In an age where large amounts of data makes possible a more predictive risk management environment, financial institutions have a desire to automate data processing in the strategic and tactical application of the execution of the underwriting process.

The performance and quality of a heuristic algorithm solution can be validated by statistically comparing its outcomes against standard methods (manual and semi-automated processes) currently employed by financial institutions. Data analysts can perform statistical analysis of heuristic algorithms based almost entirely on quantitative data. However, in many cases quantitative data does not appropriately measure the nature or complexity of a given problem. Although the data analysts perform a robust statistical examination of the heuristic algorithm, if the data under analysis fails to provide a reliable assessment of the problem on hand the results from the statistical analysis may not be conclusive.

Data analysts may also perform a qualitative analysis of the performance and quality of the solution offered by a heuristic algorithm. Although a qualitative analysis may offer flexibility to perform an in-depth assessment of the heuristic algorithm and may account for expert's opinions and experience, a robust and systematic comparison between the heuristic algorithm and current methods approaching the problem may not be guaranteed.

For the forgoing reasons, there is a need for a method that allows a more accurate and efficient validation of algorithmic underwriting outcomes.

SUMMARY

Embodiments in the present disclosure may be directed to provide a method for validating outcomes of heuristic underwriting against standard methods. In one embodiment, a system architecture that may allow the method to operate is disclosed. An embodiment of the method includes selecting a first set of term policies underwritten with a predetermined underwriting method, selecting a second set of term policies underwritten by a heuristic underwriting method, and associating respective sets of qualitative indicators with the first and second sets of term policies. The method further includes mapping the respective sets of qualitative indicators to respective sets of quantitative variables for the first and second sets of term policies, and evaluating statistical significance in performance between the first and second sets of term policies based on the respective quantitative variables. The system architecture may include an underwriting platform and a heuristic validation platform connected over a network connection. The underwriting platform may be connected over a network connection to one or more client computing devices and a first database. The heuristic validation platform may be connected over a network connection to one or more client computing devices and a second database. In one embodiment, a heuristic validation platform includes a data retrieval module, an artificial intelligence engine, and a statistical engine.

According to an embodiment, a heuristic validation platform allows one or more users, or top performing underwriters to make a comparison between a company's standard underwriting process and a heuristic algorithm by reviewing random samples of term policies processed by the aforementioned methods. One or more users perform a qualitative assessment of the output of each method based on the company's indicators, underwriting standards, experience and intuition. Then an artificial intelligence engine, operating within the heuristic validation platform uses fuzzy logic techniques to map the qualitative assessment into quantitative data. Based on the quantitative data, a statistical engine operating within the validation platform determines if there is a significant difference between the performances of the methods.

According to another embodiment, a heuristic validation platform allows one or more users, or top performing underwriters to make a comparison between a company's standard underwriting process and a heuristic algorithm. In this embodiment, a random sample of term policies processed by the current company's method is selected. Then each term policy is re-underwritten using a heuristic algorithm. Further to this embodiment, one or more underwriters perform a qualitative assessment of the methods based on the company's indicators and underwriting standards. Then an artificial intelligence engine, operating within the heuristic validation platform uses fuzzy logic techniques to map the qualitative assessment into quantitative data. Based on the quantitative data, a statistical engine operating within the validation platform determines if there is a significant difference between the performances of the methods.

In some embodiments, a server-implemented method may include generating, by a server, a machine learning model comprising a network of decision nodes using a training dataset, the machine learning model is configured to emulate resolution patterns corresponding to processing of one or more customer requests by one or more users, each decision node corresponds to an electronic document generated by the one or more users in response to each customer request, wherein the one or more users are selected from a set of users based on satisfying a performance threshold, wherein each electronic document comprises a score associated with at least each customer request; periodically monitoring, by the server, profiles associated with the one or more users to identify a status change in the profiles associated with the one or more users; in response to identifying the status change in the profiles associated with the one or more users, updating, by the server, the training dataset based on new data associated with the profiles of the one or more users; receiving, by the server via a graphical user interface displayed on a client computing device, an electronic request to compare a performance of an output from the machine learning model with a statistical model; executing, by the server, the machine learning model on a first set of customer requests of a first set of customers to generate a first set of electronic documents corresponding to the first set of customer requests; executing, by the server, the statistical model on a second set of customer requests of a second set of customers to generate a second set of electronic documents corresponding to the second set of customer requests; randomly selecting, by the server, a first subset of electronic documents from the first set of electronic documents and a second subset of electronic documents from the second set of electronic documents; executing, by the server, a comparison protocol to compare the scores of the first subset of electronic documents with the scores of the second subset of electronic documents; and updating, by the server, the graphical user interface with a result of the execution of the comparison protocol.

In some embodiments, a system may include a server configured to: generate a machine learning model comprising a network of decision nodes using a training dataset, the machine learning model is configured to emulate resolution patterns corresponding to processing of one or more customer requests by one or more users, each decision node corresponds to an electronic document generated by the one or more users in response to each customer request, wherein the one or more users are selected from a set of users based on satisfying a performance threshold, wherein each electronic document comprises a score associated with at least each customer request; periodically monitor profiles associated with the one or more users to identify a status change in the profiles associated with the one or more users; in response to identifying the status change in the profiles associated with the one or more users, update the training dataset based on new data associated with the profiles of the one or more users; receive via a graphical user interface displayed on a client computing device, an electronic request to compare a performance of an output from the machine learning model with a statistical model; execute the machine learning model on a first set of customer requests of a first set of customers to generate a first set of electronic documents corresponding to the first set of customer requests; execute the statistical model on a second set of customer requests of a second set of customers to generate a second set of electronic documents corresponding to the second set of customer requests; randomly select a first subset of electronic documents from the first set of electronic documents and a second subset of electronic documents from the second set of electronic documents; execute a comparison protocol to compare the scores of the first subset of electronic documents with the scores of the second subset of electronic documents; and update the graphical user interface with a result of the execution of the comparison protocol.

BRIEF DESCRIPTION OF THE DRAWINGS

Non-limiting embodiments of the present subject matter are described by way of example with reference to the accompanying figures which are schematic and are not intended to be drawn to scale. Unless indicated as representing the background art, the figures represent aspects of the subject matter.

DETAILED DESCRIPTION

Figure 1:
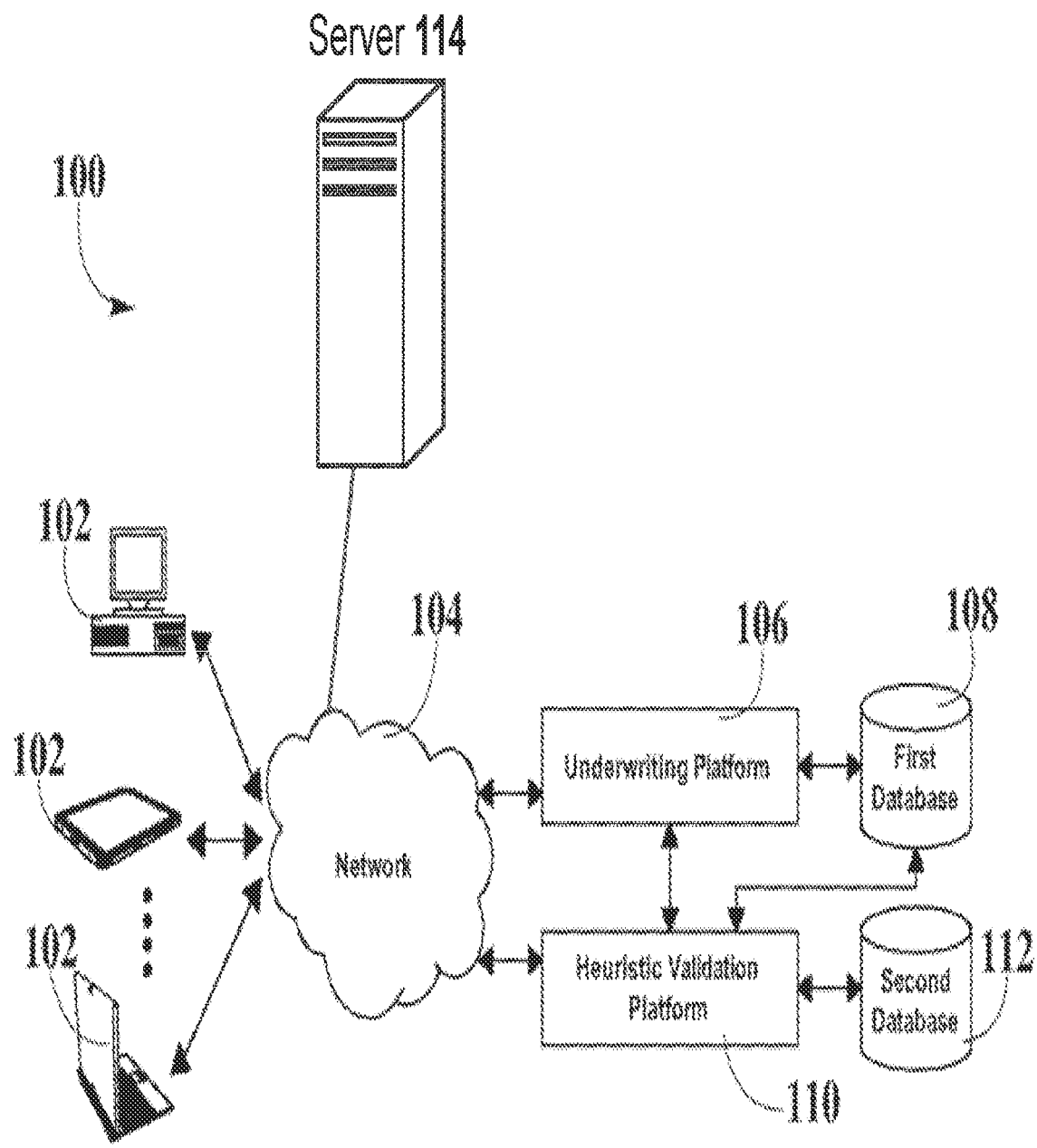
FIG. 1 is a functional block diagram illustrating a system architecture for validating the outcome derived from heuristic algorithms in the underwriting process, according to an embodiment.

Reference will now be made to the embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments in the drawings, which form a part here. Other embodiments may be used and/or other changes may be made without departing from the spirit or scope of the present disclosure. The embodiments described in the detailed description are not meant to be limiting of the subject matter presented here.

As used here, the following terms may have the following definitions:

"Premium" refers to a periodic payment that a customer offers to a financial institution.

"Underwriting process" refers to the assessment of a risk associated with a potential customer. It defines the risk that a financial institution may accept in exchange for the payment of a premium.

"Underwriting platform" refers to a software where data may be sorted, processed and analyzed by a set of application tools to provide insightful advice to the user.

"Factor" refers to information which can be used as a reference for measuring the risk associated with a potential customer. A factor may be information such as age, current health, occupation, and the like.

"Heuristic algorithm" refers to an algorithm which measures the risk of a potential customer. Underwriting decision heuristic can set a premium based on the company's standards and best underwriting practices gathered from top performing underwriters.

"Term Policy" refers to any contract insuring a person or goods during an established period of time.

"Heuristic validation platform" refers to one or more software modules used to validate one or more underwriting methods.

"Artificial intelligence engine" refers to a software module which employs fuzzy logic techniques for mapping qualitative user-supplied qualitative data into quantitative data. The artificial intelligence engine simplifies the accurate representation or/and evaluation of a process, method, or system.

"Statistical engine" refers to a software module able to perform descriptive statistics and statistical experiments over one or more sample data sets.

FIG. 1 is a functional block diagram illustrating an exemplary system architecture for validating the outcome derived from heuristic algorithms in the underwriting process. In FIG. 1, system architecture 100 includes one or more client computing devices 102, a network connection 104, an underwriting platform 106, a first database 108, a heuristic validation platform 110, a second database 112, and a server 114.

The client computing devices 102 are operatively coupled to and in bi-directional communication with network connection 104. Network connection 104 is operatively coupled to and in bi-directional communication with underwriting platform 106. Underwriting platform 106 is operatively coupled to and in bi-directional communication with first database 108. Additionally, underwriting platform 106 is operatively coupled to and in bi-directional communication with heuristic validation platform 110. Heuristic validation platform 110 is operatively coupled to and in bi-directional communication with first database 108. Additionally, heuristic validation platform 110 is operatively coupled to and in bi-directional communication with second database 112. The client computing devices 102 can be implemented as one or more smartphones, desktop computers, laptop computers, servers, tablets, PDAs, single computer with multiple processors, several networked computers, specialized hardware, and the like. In some embodiments, client computing devices 102 are used by agents to perform duties associated with underwriting as well as validations of the outcomes derived from underwriting heuristics.

The server 114 is operatively coupled to and in bi-directional communication with the client computing devices 102, the first database 108, and the second database 112. The server 114 may be a computing device comprising a processor and non-transitory machine-readable storage capable of executing various tasks and processes described herein. Non-limiting examples of the computing devices may include workstation computers, laptop computers, server computers, laptop computers, and the like. While the system architecture 100 includes a single server 114, in some embodiments the system architecture 100 may include any number of server computing devices operating in a distributed computing environment.

The network connection 104 can be implemented as hardware, software, and/or firmware that interconnect and otherwise couple computing devices to allow effective communication between the aforementioned computing devices. Examples of network connections 104 include intranets, local area networks (LANs), virtual private networks (VPNs), wide area networks (WANs), the Internet, and the like. The network connection 104 may further include both wired and wireless communications according to one or more standards and/or via one or more transport mediums. The communication over the network connection 104 may be performed in accordance with various communication protocols such as Transmission Control Protocol and Internet Protocol (TCP/IP), User Datagram Protocol (UDP), and IEEE communication protocols. In one example, the network connection 104 may include wireless communications according to Bluetooth specification sets, or another standard or proprietary wireless communication protocol. In another example, the network connection 104 may also include communications over a cellular network, including, e.g. a GSM (Global System for Mobile Communications), CDMA (Code Division Multiple Access), and EDGE (Enhanced Data for Global Evolution) network.

The underwriting platform 106 can be implemented as one or more software modules that are run on a server, a single computer or multiple computers in a distributed configuration. In some embodiments, underwriting platform 106 includes an analytical engine that allows a set of decision tools to provide feedback or insightful advice to agents through client computing devices 102. In some embodiments, the feedback provided by underwriting platform 106 allows agents to make decisions about whether to provide a specific financial service to an applicant. In these embodiments, the decisions are based on a set of factors and best practices derived from top performing underwriters. In some embodiments, underwriting platform 106 retrieves information from first database 108 in order to run one or more analyses.

The first database 108 is implemented as a relational database that receives and stores information about both the data and how it is related, and then provides the data to authorized requestors upon request. In these embodiments, first database 108 is implemented as conventional database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The first database 108 may store a set of instructions, signal data, timestamps, and navigation messages. The first database 108 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. The first database 108 may further include one or more instructions that are executable by a processor associated with the server 104.

The data stored in first database 108 include term policies underwritten using a heuristic algorithm. In these embodiments, said term policies are used as for comparison purposes. Further to these embodiments, term policies underwritten using a heuristic algorithm are compared against term policies underwritten using a company's standard process.

The first database 108 receives data from external sources, such as, for example the Internet, Social Networks, and other institutions like banks, hospitals, and the like. In these embodiments, the data received from external sources can be drug histories, credit histories, and the like.

The heuristic validation platform 110 can be implemented as one or more software modules executed by a server, a single computer or multiple computers in a distributed configuration. In some embodiments, heuristic validation platform 110 is a collection of components that interact with each other in order to accept requests from agents and provide responses. In these embodiments, heuristic validation platform 110 additionally includes programming to serve the requests of other programs, the client programs. Thus, the server performs some tasks on behalf of client programs. Examples of client programs running on heuristic validation platform 110 include programs designed and built to store underwritten term policies, select random samples of term policies for comparing the quality of solutions provided by a heuristic algorithm with the quality of solutions provided by a standard process employed by a company, allow one or more users to perform a qualitative assessment of the methods under evaluation, translate said qualitative assessments into quantitative data, and use statistical techniques for determining a relevant difference between the methods under analysis.

The second database 112 is implemented as a relational database that stores information about both the data and how it is related. In these embodiments, second database 112 is implemented as conventional database management systems (DBMS), such as, for example MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The data stored in second database 112 include term policies underwritten using a company's standard process. In this embodiment, said term policies are used for comparison purposes. In these embodiments, term policies underwritten using a company's standard processes are compared against term policies underwritten using a heuristic algorithm.

In operation, the client computing devices 102 allows a user to request a comparison between a heuristic algorithm and a standard process employed by a company. Upon the user's request, the heuristic validation platform 110 selects a random sample of term policies underwritten by the heuristic algorithm as well as a random sample of term policies underwritten using the company's standard process. Afterwards, the heuristic validation platform 110 allows the user to perform a qualitative assessment of the methods under evaluation. Next, the heuristic validation platform 110 converts the qualitative assessments into quantitative data. Then, the heuristic validation platform 110 employs one or more statistical techniques to determine if there is a significant difference in the performance of the methods under evaluation. Finally, the heuristic validation platform 110 presents the results to the user through the client computing devices 102.

Figure 2:
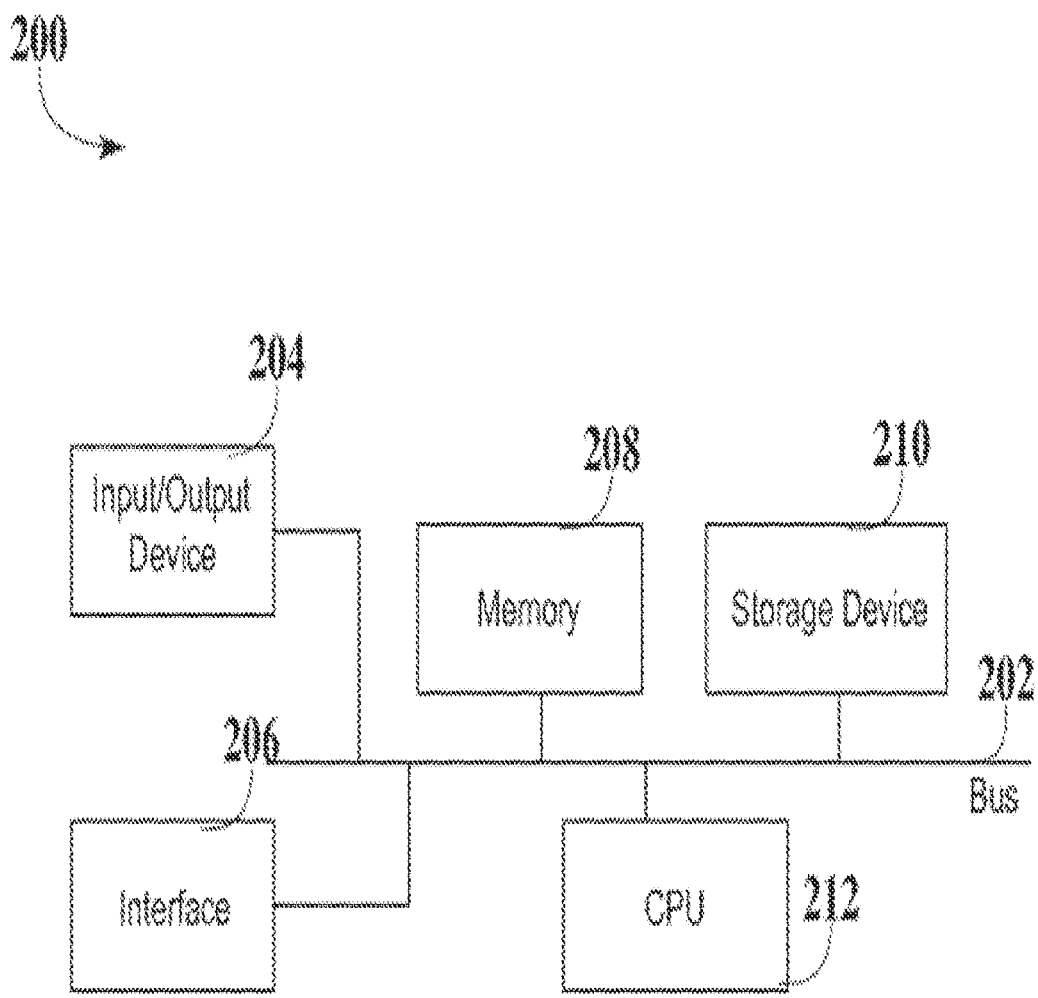
FIG. 2 is an illustration of a computing device or server in which one or more embodiments of the present disclosure operate, according to an embodiment.

FIG. 2 is an illustration of a computing device or server in which one or more embodiments of the implementation operate, according to an embodiment. In one embodiment, computing device 200 includes bus 202, input/output (I/O) device 204, communication interface 206, memory 208, storage device 210 and central processing unit 212. In other embodiments, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable an examiner or candidate to input information to computing device 200, including a keyboard, computer mice, buttons, touch screens, touch-pad, voice recognition, biometric mechanisms, and the like. (I/O) device 204 also includes a mechanism that outputs information to the examiner or candidate using computing device 200, such as, a display, a microphone, a light emitting diode (LED), a printer, a speaker, orientation sensors, and the like. Said orientation sensors include one or more accelerometers, one or more gyroscopes, one or more compasses, and the like. The accelerometer provides a respective change of a respective angle about a respective axis. The gyroscope provides a respective rate of change of a respective angle about a respective axis and the compass provides a compass heading.

Examples of communication interface 206 include mechanisms that enable computing device 200 to communicate with other computing devices and/or systems through network connections. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In other embodiments, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, client computing devices 102, or other components of system architecture 100. Examples of these implementations include servers, authorized computing devices, smartphones, desktop computers, laptop computers, tablet computers, PDAs, another type of processor-controlled device that receives, processes, transmits digital data, and the like. Additionally, computing device 200 performs certain operations that are required for the proper operation of the systems and methods described herein. Computing devices 200 perform these operations in response to central processing unit 212 executing software instructions contained in a computer-readable medium, such as memory 208.

In one embodiment, the software instructions of the system are read into memory 208 from another memory location, such as storage device 210, or from another computing device 200 (e.g., client computing devices 102, and the like) via communication interface 206. In this embodiment, the software instructions contained within memory 208 instruct central processing unit 212 to perform processes that will be described below in FIGS. 3-5.

Figure 3:
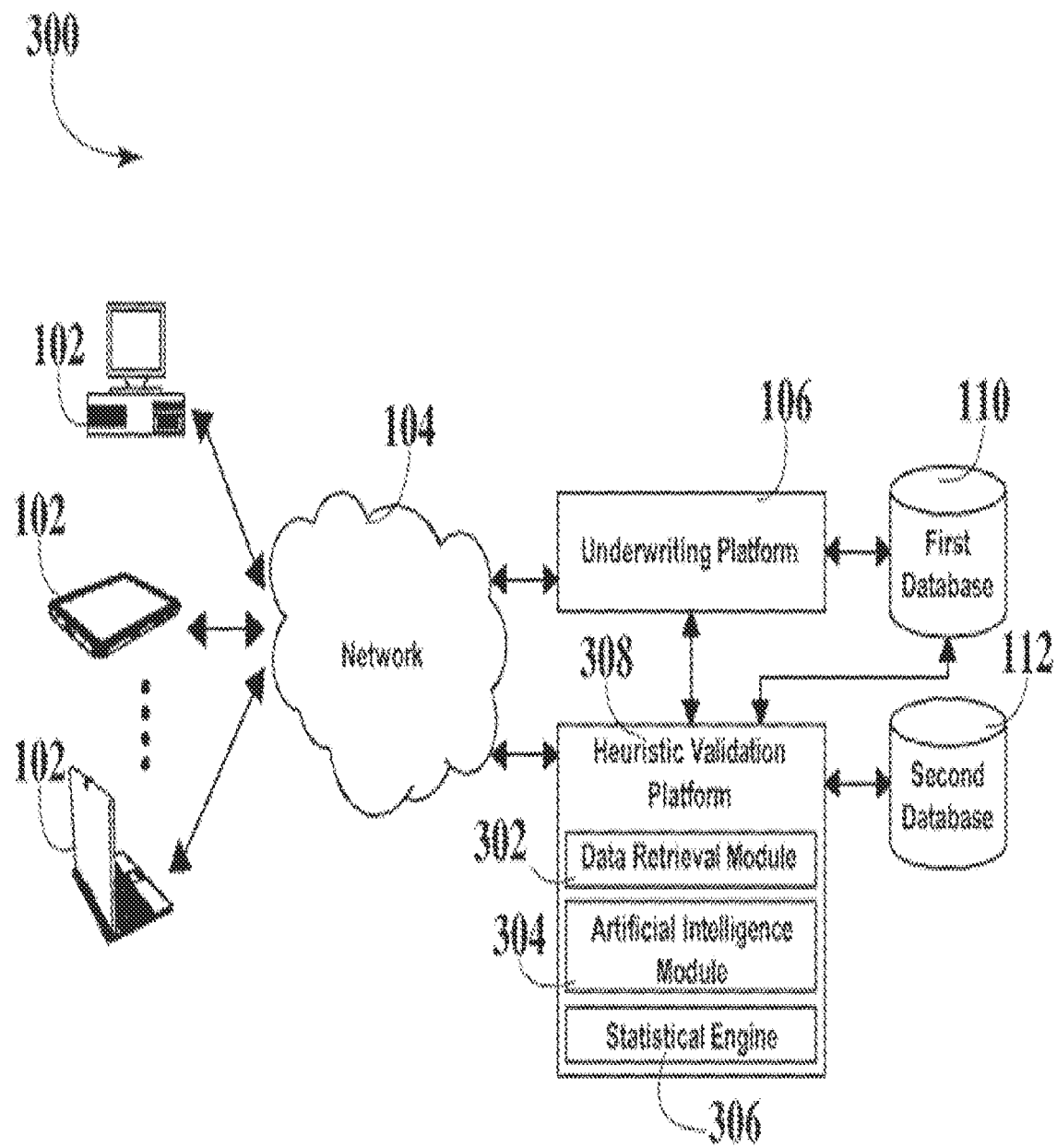
FIG. 3 is a block diagram illustrating a subsystem of a portion of the system architecture of FIG. 1 and pertaining to a heuristic validation platform, according to an embodiment.

FIG. 3 is a block diagram illustrating a portion of system architecture 100 pertaining to a heuristic validation platform. In FIG. 3, heuristic validation platform 308 further includes data retrieval module 302, artificial intelligence engine 304, and statistical engine 306. Although heuristic validation platform 308 includes the listed components, it should be understood that heuristic validation platform 308 can include less components, more components, or different components depending on the desired analysis goals. In an example and referring to FIG. 1, said heuristic validation platform 308 is implemented as heuristic validation platform 110 in system architecture 100. In FIG. 3, heuristic validation platform 308 is operatively coupled to and in bi-directional communication with database 112. Additionally, heuristic validation platform 308 is operatively coupled to and in bi-directional communication with underwriting platform 106.

In one embodiment, heuristic validation platform 308 and its sub-components are implemented as one or more computer software modules that include programmatic rules or logic for analyzing data and underwriting potential customers. In this embodiment, data retrieval module 302 randomly extracts underwritten term policies using a heuristic underwriting method and term policies using a company's standard process for underwriting. Said samples are then reviewed and qualitatively assessed by a user. In this embodiment, the qualitative assessments performed by a user are converted into quantitative data by artificial intelligence engine 304. The quantitative data is then stored. In these embodiments, statistical engine 306 employs one or more statistical techniques for determining any significant difference between the methods under review.

Data retrieval module 302 is configured to extract previously underwritten term policies, where term policies underwritten using a heuristic algorithm are stored in first database 108 and term policies underwritten using a company's standard process are stored in second database 112. In one embodiment, data retrieval module 302 includes a pseudo-random number generator for extracting random samples of the aforementioned databases.

In other embodiments, data retrieval module 302 executes a pseudo-random number generator for extracting a random sample of term policies underwritten using a company's standard process. The term policies are then re-underwritten by underwriting platform 106 using a heuristic algorithm to produce a sample of underwritten term policies that can be compared against the sample of term policies underwritten using the company's standard. In these embodiments, the samples of underwritten term policies using an underwriting algorithm are extracted from first database 108 by data retrieval module 302.

Artificial intelligence engine 304 is configured to convert qualitative assessments into quantitative data. The quantitative data is then stored. In one embodiment, artificial intelligence engine 304 performs the conversion using artificial intelligence techniques such as fuzzy logic.

Statistical engine 306 is configured to employ one or more statistical techniques such as analysis of variance or design of experiments for finding relevant differences in performance between the methods under review. In one embodiment, indicators of statistical difference along with mean performance values provide insight into which of the methods under review provides better performance.

In an operation, given a request for comparing term policies using a heuristic underwriting method and term policies using a company's standard process for underwriting, data retrieval module 302 executes a pseudo-random number generator for extracting a random sample of term policies from first database 108 and a random sample of term policies from second database 112. In this example, said databases store underwritten term policies using a heuristic algorithm and underwritten term policies using a company's standard process respectively. Next, client computing devices 102 allows a user to perform a qualitative assessment of the quality of the term policies associated with each sample. In this example, artificial intelligence engine 304 employs fuzzy logic for converting the qualitative assessments into quantitative data. Further to this example, statistical engine 306 uses an analysis of variance for determining any significant difference between the methods under analysis.

A plurality of methods implemented by heuristic validation platform 308 are performed by one or more computing devices such as computing device 200. The methods are implemented with components of the operating environments of FIGS. 1-3. The steps of this method are embodied in a computer readable medium containing a computer readable code such that the steps are implemented when the computer readable code is executed by a computing device. While the blocks in the disclosed process are shown in a particular order, the actual order may differ. In some embodiments, some steps are performed in parallel.

Figure 4:
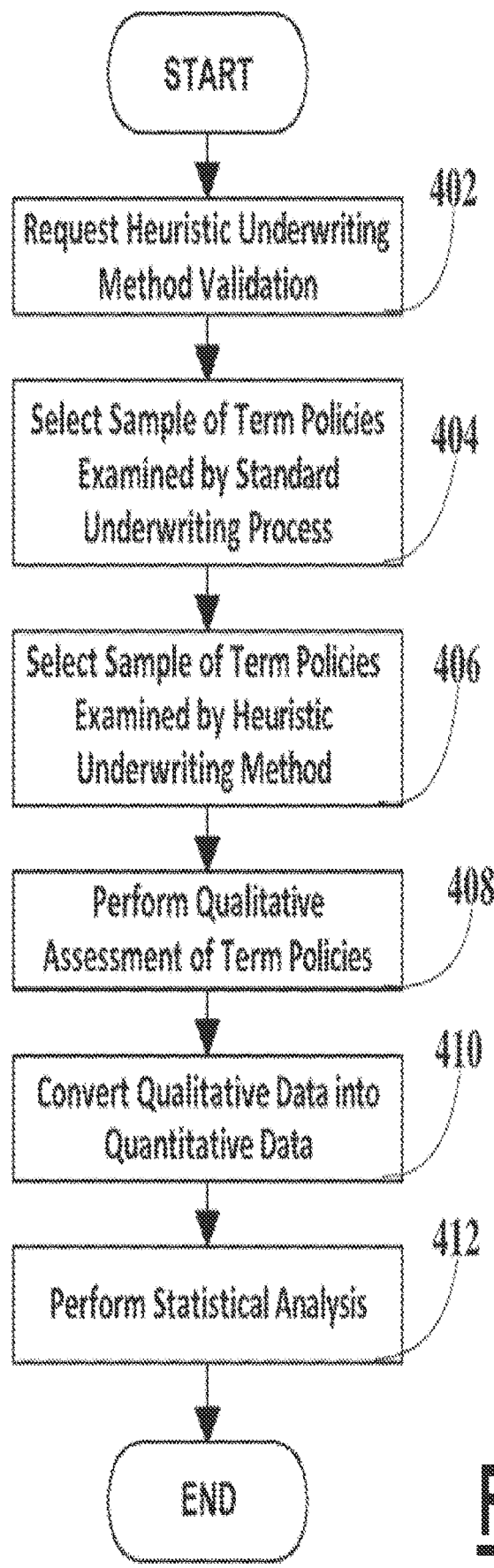
FIG. 4 is a flow diagram describing a first embodiment of a method for validating the outcome derived from heuristic algorithms in the underwriting process, according to an embodiment.

FIG. 4 is a flow diagram describing a first embodiment of a method 400 for validating the outcome of heuristic algorithms in the underwriting process. The steps of the method are implemented with components of the operating environments of FIGS. 1-3. The steps of this method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 4, method 400 begins at step 402 where a heuristic validation platform receives a request for validating the outcomes derived from a heuristic underwriting method. In one embodiment, said validation includes comparing term policies using a heuristic underwriting method and term policies using a company's standard process for underwriting. In this embodiment, a client computing device allows a user to perform said request. Further this embodiment, the user defines the sample size of the term policies to be reviewed. In one or more embodiments, the user in charge of reviewing the term policies is a top performing underwriter. Method 400 then moves to step 404.

At step 404, the data retrieval module selects a sample of term policies examined by a standard underwriting process using a stream of uniformly distributed random numbers. In one embodiment, the data retrieval module executes a pseudo-random number generator for creating the stream of random numbers. In this embodiment, said term policies are stored in a second database coupled to heuristic validation platform. Method 400 then moves to step 406.

At step 406, the data retrieval module selects a sample of term policies examined by a heuristic underwriting method using a stream of uniformly distributed random numbers. In one embodiment, the data retrieval module executes a pseudo-random number generator for creating the stream of random numbers. In this embodiment, said term policies are stored in a first database coupled to heuristic validation platform. Method 400 then moves to step 408.

In one embodiment, each term policy stored in the aforementioned databases has equal chance of being selected by the data retrieval module because the random numbers employed are uniformly distributed.

At step 408, the client computing device allows a user to perform a qualitative assessment of the term policies underwritten by the methods under review. In one embodiment, the qualitative assessment is based on the user experience, intuition and the company's underwriting standards and indicators. Further to this embodiment, the assessment describes the performance of a given underwriting method. Method 400 then moves to step 410.

At step 410, the artificial intelligence engine converts the qualitative assessments into quantitative data for further statistical analysis. In one embodiment, the artificial intelligence engine employs fuzzy logic techniques for said conversion. In this embodiment, fuzzy logic techniques include triangular fuzzy membership function, trapezoidal fuzzy membership function, center of gravity method, and the like. Method 400 then moves to step 412.

At step 412, a statistical engine performs a statistical analysis of the quantitative data conceptualizing the performance of the standard underwriting process employed by the company and the performance of the underwriting heuristic. In one embodiment, said analysis is performed using statistical methods such as analysis of variance or any other design of experiment technique. Further to this embodiment, the statistical engine determines if the difference between the performances of both methods is statistically significant and provides a solution concluding which method provides better performance. In some embodiments, the performance of an underwriting method is measure based on accuracy, speed, efficiency, and the like. The solutions are presented to the user through the client computing device.

Figure 5:
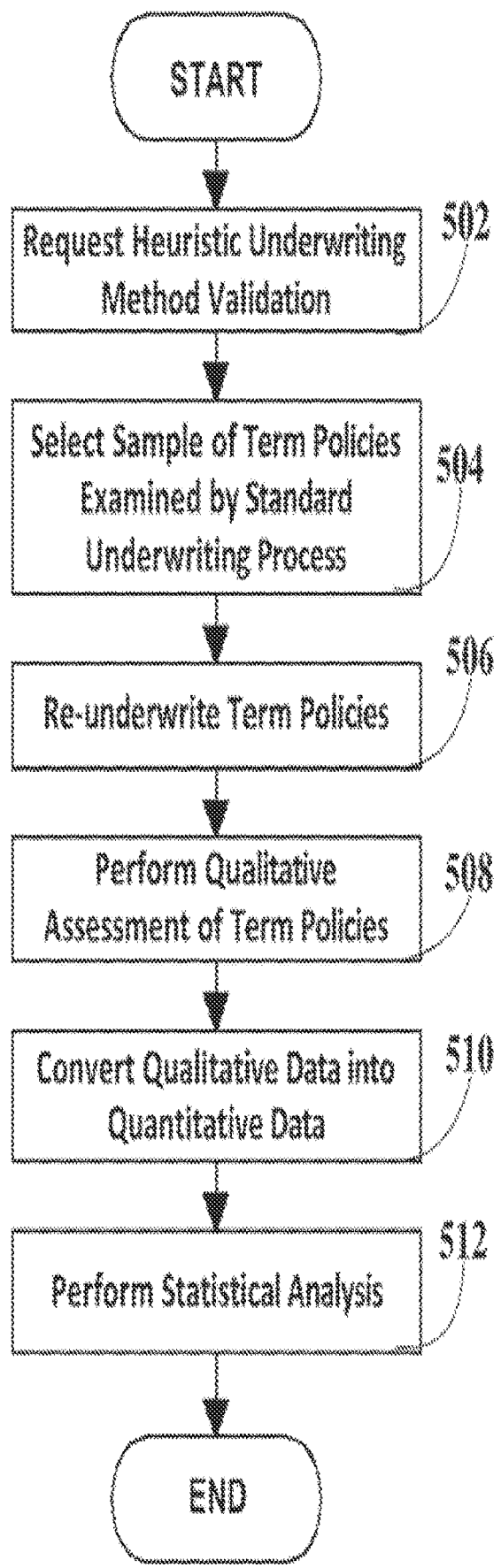
FIG. 5 is a flow diagram describing a second embodiment of a method for validating the outcome derived from heuristic algorithms in the underwriting process, according to an embodiment.

FIG. 5 is a second embodiment of a flow diagram generally illustrating a method 500 for validating the outcome derived from heuristic algorithms in the underwriting process. The steps of the method are implemented with components of the operating environments of FIGS. 1-3. The steps of this method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 5 the process begins at step 502, where a heuristic validation platform receives a request for validating the outcomes derived from a heuristic underwriting method. In one embodiment, said validation includes comparing term policies using a heuristic underwriting method and term policies using a company's standard process for underwriting. In this embodiment, a client computing device allows a user to perform said request. Further this embodiment, the user defines the sample size of the term policies to be reviewed. In one or more embodiments, the user in charge of reviewing the term policies is a top performing underwriter. Method 500 then moves to step 504.

At step 504, the data retrieval module selects a sample of term policies examined by a standard underwriting process using a stream of uniformly distributed random numbers. In one embodiment, the data retrieval module executes a pseudo-random number generator for creating the stream of random numbers. In this embodiment, said term policies are stored in a database coupled to a heuristic validation platform. Method 500 then moves to step 506.

At step 506, the heuristic validation platform cooperates with an underwriting platform for re-underwriting each of the previously extracted term policies using for that end a heuristic underwriting method. In one embodiment, the results provided by the underwriting method are stored in a database, where they are available for data retrieval module. Method 500 then moves to step 506.

At step 508, the client computing device allows a user to perform a qualitative assessment of the term policies underwritten by the methods under review. In one embodiment, the qualitative assessment is based on the user experience, intuition and the company's underwriting standards and indicators. Further to this embodiment, the assessment describes the performance of a given underwriting method. Method 500 then moves to step 510.

At step 510, the artificial intelligence engine converts the qualitative assessments into quantitative data for further statistical analysis. In one embodiment, the artificial intelligence engine employs fuzzy logic techniques for said conversion. In this embodiment, fuzzy logic techniques include triangular fuzzy membership function, trapezoidal fuzzy membership function, center of gravity method, and the like. Method 500 then moves to step 512.

At step 512, a statistical engine performs a statistical analysis of the quantitative data conceptualizing the performance of the standard underwriting process employed by the company and the performance of the underwriting heuristic. In one embodiment, said analysis is performed using statistical method such as analysis of variance or any other design of experiment technique. Further to this embodiment, the statistical engine determines if the difference between the performances of both methods is statistically significant and provides a solution concluding which method provides better performance. In some embodiments, the performance of an underwriting method is measured based on accuracy, speed, efficiency, and the like. The solutions are presented to the user through the client computing device.

By executing method 400 and method 500 through the operating environments shown in FIGS. 1-3, big data analytics and data mining techniques can be implemented for a more efficient and faster processing of larger data sets. In this way, efficiencies are created by providing ways to validate heuristic methods in the underwriting process. These features allow performing large work such as heavy calculations and time consuming analysis in a more efficient manner than other approaches such as manual work performed by humans.

Figure 6:
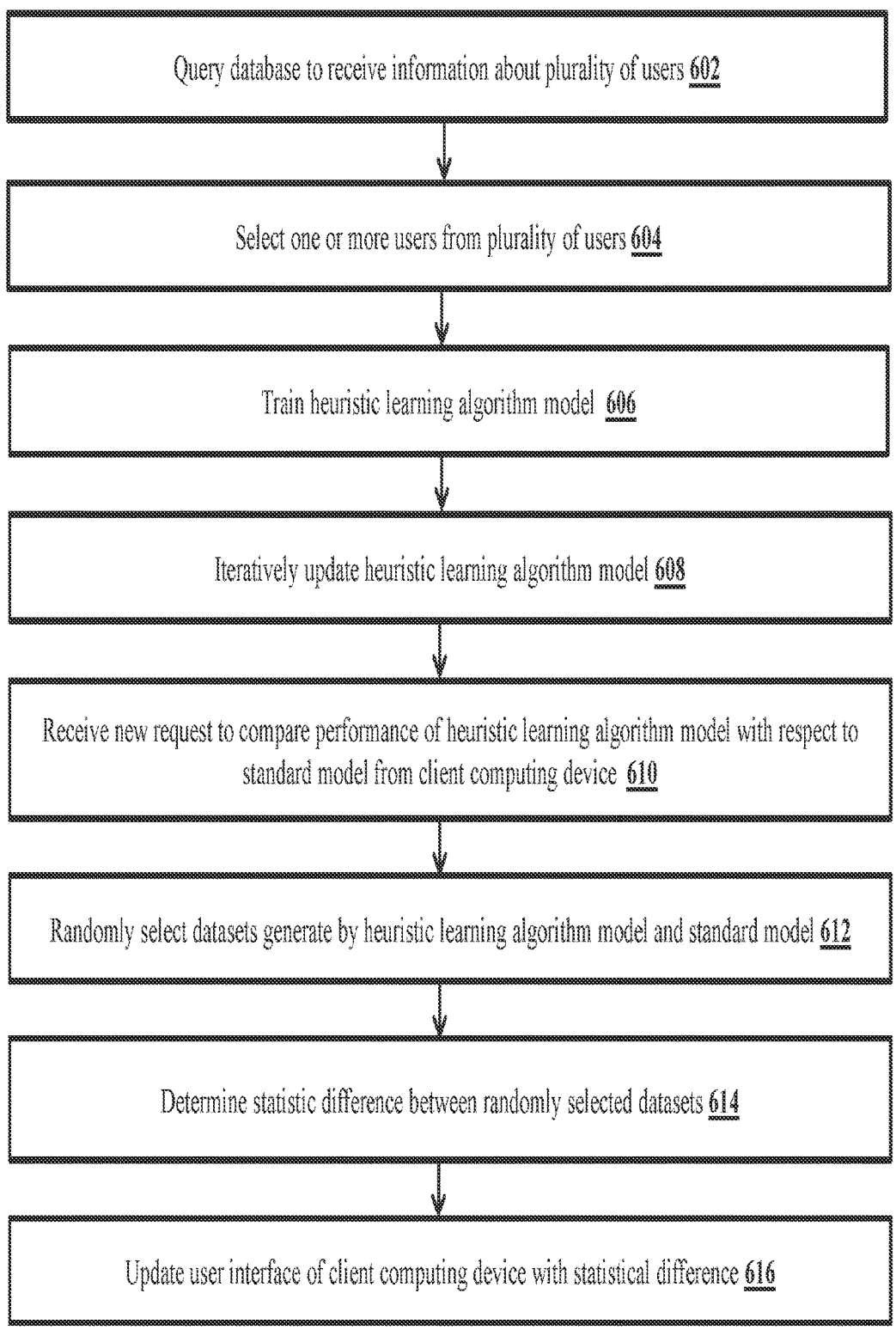
FIG. 6 shows execution of a method for comparing performance of different types of computer models, according to an embodiment.

FIG. 6 shows execution of a method for comparing performance of different computer models, according to a method 600. The method 600 shown in FIG. 6 may include execution steps 602, 604, 606, 608, 610, 612, 614 and 616. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 600 of the FIG. 6 is described as being executed by a single server in this embodiment. However, one having skill in the art will appreciate that, in some embodiments, steps may be executed by any number of servers operating in a distributed network environment.

In step 602, a server may query a database to retrieve information about a plurality of users from a profile of the plurality of users. The database may store the profile of the plurality of users. The profile of each user may include performance results of each user. The performance results of each user may include data records associated with one or more execution techniques implemented by each user in response to an application request from a customer. In response to the query, the server may extract and retrieve the information from the profile of the plurality of users stored in the database.

In a next step 604, a server may execute an algorithm to identify one or more attributes associated with the profile of the plurality of users. A first attribute may correspond to a time taken by each user to successfully complete the application request. A second attribute may correspond to a revenue generated by each user with regards to each application request. A third attribute may correspond to a number of cases associated with each application request completed by the user. A fourth attribute may correspond to an education value associated with each user. The server may execute a ranking algorithm to rank the plurality of users based on the one or more attributes. The server may store the rank of each user in the database. The server may determine one or more users from the plurality of users that satisfies a pre-determined threshold ranking value. The server may store the one or more users in the database.

In a next step 606, a server may train a heuristic learning algorithm model, which is configured to emulate resolution patterns or working patterns of the one or more users corresponding to processing of the application requests of one or more previously-considered customers by the one or more users. The heuristic learning algorithm model may be a machine learning data model, which may include data trees. During the training process of the heuristic learning algorithm model, the server may receive an input of a heuristic learning algorithm dataset. The heuristic learning algorithm dataset may include the profile data associated with the one or more users. The server may use a support vector machine with the heuristic learning algorithm dataset as an input to generate the heuristic learning algorithm model. The support vector machine is a supervised learning model with associated learning algorithms that analyze the profile data used for classification and regression analysis. The support vector machine training algorithm builds the heuristic learning algorithm model that assigns new data to one category or the other, making it a non-probabilistic binary linear classifier. The heuristic learning algorithm model is a representation of the data as points in space.

The heuristic learning algorithm model may include a network of decision nodes. Each decision node may correspond to a decision made by one or more users of the plurality of users while processing the application requests. A user may execute the heuristic learning algorithm model to process any new application requests.

In a next step 608, a server may continually receive notifications from a database processor associated with the processor. The notifications may be regarding modification of data associated with the profile of the plurality of users stored in the database. In one instance, the server may receive a first notification from the database processor regarding update of the data associated with the profile of the plurality of users stored in the database. The server may extract a first set of modified data associated with the profile of the plurality of users from the database. The server may process the first set of modified data. Based on the processing, the server may determine whether the first set of modified data is associated with the profile of the one or more users of the plurality of users. When the server determines that at least a first portion of the first set of modified data is associated with the profile of one or more users, the server may extract the first portion of the first set of modified data. The server may update the heuristic learning algorithm dataset using the first portion of the first set of modified data. The server may retrain the heuristic learning algorithm model using the updated heuristic learning algorithm dataset.

In another instance, the server may receive a second notification from the database processor regarding update of the data associated with the profile of the plurality of users stored in the database. The server may extract a second set of modified data associated with the profile of the plurality of users from the database. The server may process the second set of modified data. Based on the processing, the server may determine whether the second set of modified data is associated with the profile of the one or more users of the plurality of users. When the server determines that at least a first portion of the second set of modified data is associated with the one or more users, the server may extract the first portion of the second set of modified data. The server may update the heuristic learning algorithm dataset using the first portion of the second set of modified data. The server may retrain the heuristic learning algorithm model using the updated heuristic learning algorithm dataset.

In a next step 610, a server may generate a graphical user interface on a client computing device. The server may receive a new request from the graphical user interface of the client computing device to compare performance of an output generated by the heuristic learning algorithm model and a standard model.

The standard model may include one or more software programs to process application requests of the customers. The application request may include a request for a health-related service. The health-related service may be a healthcare insurance policy. Upon processing of the application requests, the standard model may generate a first set of datasets associated with the health-related service. The server may store the first set of datasets in the database.

In a next step 612, a server may randomly select multiple different datasets associated with the health-related service from the database. The datasets associated with the health-related service may be generated using different models. For instance, the datasets may include a first set of datasets associated with the health-related service generated using the standard model. The datasets may further include a second set of datasets associated with the health-related service generated using the heuristic learning algorithm model.

The server may execute a pseudo-random number generator to randomly select the first set of datasets associated with the health-related service and the second set of datasets associated with the health-related service from the database. The pseudo-random number generator may include an algorithm that uses mathematical formulas to produce sequences of random numbers. The pseudo-random number generator may generate a sequence of numbers approximating the properties of random numbers. For example, the pseudo-random number generator may start from an arbitrary starting state using a seed state. The many numbers are generated in a short time and can also be reproduced later, if the starting point in the sequence is known.

In a next step 614, a server may determine a set of qualitative indicators within the first set of datasets and the second set of datasets. The set of qualitative indicators may be associated with the working experience of a user, the underwriting standard of a company of the user, and the earned value of the user, estimate to complete, money spent/month, average time to delivery, tasks, project overhead, and planned delivery date versus actual delivery date. The server may map the set of qualitative indicators into a set of quantitative variables associated with the first set of datasets and the second set of datasets. The server may execute a fuzzy logic program to map the set of qualitative indicators into the set of quantitative variables. The server may compare the set of quantitative variables associated with the first set of datasets and the second set of datasets. Based on the comparison, the server may determine a statistical difference between the first set of datasets and the second set of datasets. The server may update input datasets of the heuristic learning algorithm model based on the evaluation of the statistical difference. The server may update programs of various machine learning algorithms of the heuristic learning algorithm model based on the evaluation of the statistical difference.

In a next step 616, a server may update the graphical user interface of the client computing device. The updated graphical user interface may present an output associated with the statistical difference between the first set of datasets and the second set of datasets. The client computing device may store the output associated with the statistical difference in an internal database associated with the client computing device. Based on the statistical difference, the client computing device may select the heuristic learning algorithm model or the standard model for processing new application requests.

In one example, when the server determines that a first healthcare insurance policy generated using the heuristic learning algorithm model is more profitable for a company than a first healthcare insurance policy generated using the standard model, based on evaluation of the statistical difference between various indicators associated with the first healthcare insurance policy generated using the heuristic learning algorithm model and the first healthcare insurance policy generated using the standard model, the server may select the heuristic learning algorithm model for processing all new application requests.

In another example, when the server determines that a second healthcare insurance policy generated using the heuristic learning algorithm model is less profitable for a company than a second healthcare insurance policy generated using the standard model, based on evaluation of the statistical difference between various indicators associated with the second healthcare insurance policy generated using the heuristic learning algorithm model and the second healthcare insurance policy generated using the standard model, the server may select the standard model for processing all new application requests.

Figure 7:
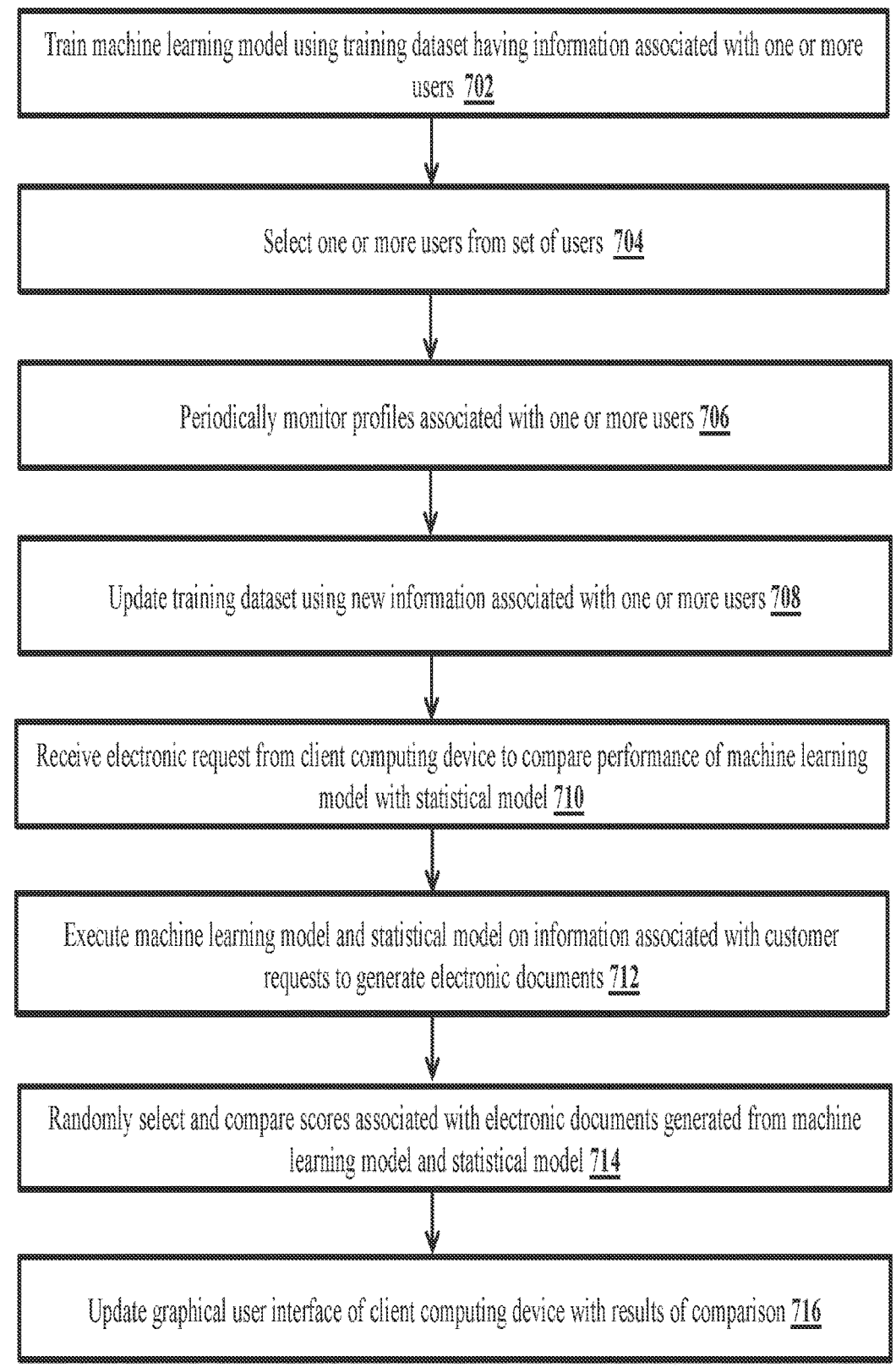
FIG. 7 shows execution of a method for comparing performance of different types of computer models, according to an embodiment.

FIG. 7 shows execution of a method for comparing performance of different computer models, according to a method 700. The method 700 shown in FIG. 7 may include execution steps 702, 704, 706, 708, 710, 712, 714, and 716. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 700 of the FIG. 7 is described as being executed by a single server in this embodiment. However, one having skill in the art will appreciate that, in some embodiments, steps may be executed by any number of servers operating in a distributed network environment.

In a first step 702, a server may train a machine learning model using a training dataset. The machine learning model may be configured to emulate resolution patterns corresponding to processing of one or more customer requests by one or more users. The customer request may include a request for a policy, such as an insurance policy. The one or more users may operate one or more user computing devices to receive and process the one or more customer requests received from one or more customers. The one or more user computing devices may generate one or more electronic documents upon processing the one or more customer requests. Each electronic document may include a score associated with the customer request. The one or more user computing devices may store the one or more electronic documents in a database.

The machine learning model may be a support-vector machine supervised learning model. The machine learning model may include a neural network of decision nodes. Each decision node may correspond to the electronic document generated by the one or more users in response to the customer request. In some embodiments, each decision node may correspond to an attribute associated with each of the one or more users. In some embodiments, some decision nodes may correspond to the attribute associated with each of the one or more users and some decision nodes may correspond to the electronic document generated by the one or more users in response to the customer request.

In a next step 704, a server may execute a selection protocol to select the one or more users from a set of users. The selection protocol may select the one or more users from the set of users, which may satisfy a predetermined performance threshold. In one instance, the server may select the one or more users from the set of users, which are top ten percent of the set of the users in terms of performance while executing the customer requests. In another instance, the server may select the one or more users from the set of users, which are top ten percent of the set of the users in terms of the profit generated for a company while working on the customer requests. In yet another instance, the server may select the one or more users from the set of users, which are top ten percent of the set of the users based on a total number of processed customer requests.

The server may store information associated with the profiles associated with the one or more users in the training dataset. Each profile may include one or more profile attributes. The profile attribute associated with each of the one or more users may include an educational qualification of each of the one or more users. The profile attribute associated with each of the one or more users may include a number of customer requests processed by each of the one or more users. The profile attribute associated with each of the one or more users may include a type of customer requests processed by each of the one or more users. The type of the customer requests may include a travel policy request, a vehicle policy request, etc.

In a next step 706, the server may be configured to periodically monitor performance of the one or more users. In one instance, the server may monitor the performance of the one or more users after every one week. In another instance, the server may monitor the performance of the one or more users after every one month.

During the periodical performance monitoring process, the server may monitor the profiles associated with the one or more users to identify a status change in the profiles associated with the one or more users. For instance, the server may monitor the number of the customer requests being processed by each of the one or more users. The server may further monitor the type of the customer requests being processed by the one or more users. The server may record and store any new information, such as the new customer requests and the new types of the new customer requests being processed by each of the one or more users in the database. The server may update the profiles of the one or more users using the new information and store updated profiles of the one or more users in the database.

In a next step 708, when there is any change in the status of the profiles of the one or more users, the server may update the training dataset with information associated with the updated profiles of the one or more users stored in the database. The server may store an updated training dataset in the database. The server may retrain the machine learning model using the updated training dataset. When the machine learning model is retrained, the server may update the decision nodes. For example, the server may generate new decision nodes using the updated training dataset. The server may also update a neural network of the decision nodes using the updated training dataset.

In a next step 710, the server may receive an electronic request via a graphical user interface of a client computing device. The client computing device may be operated by an analyst. The electronic request may be to compare a performance of an output from the machine learning model with an output from a statistical model. The server may execute the machine learning model and the statistical model to process the customer requests received from the users, and generate the electronic documents in response to the customer requests. Each electronic document may include a score. The server may use the scores to evaluate the performance of the output from the machine learning model and the statistical model.

In a next step 712, the server may receive multiple customer requests from multiple users. Each customer request may be to generate a healthcare policy. The server may execute a pseudo-random number generator to randomly select a first set of customer requests of a first set of customers from the multiple customer requests. The server may execute the machine learning model on the first set of customer requests to generate a first set of electronic documents corresponding to the first set of customer requests. The first set of electronic documents may be associated with the healthcare policy. Each electronic document in the first set of electronic documents may include the score associated with the customer request. The server may store the first set of electronic documents and the score associated with each of the first set of electronic documents in the database.

The server may execute the pseudo-random number generator to randomly select a second set of customer requests of a second set of customers from the multiple customer requests. The server may execute the statistical model on the second set of customer requests to generate a second set of electronic documents corresponding to the second set of customer requests. The second set of electronic documents may be associated with the healthcare policy. Each electronic document in the second set of electronic documents may include the score associated with the customer request. The server may store the second set of electronic documents and the score associated with each of the second set of electronic documents in the database.

In a next step 714, the server may execute the pseudo-random number generator to randomly select a first subset of electronic documents from the first set of electronic documents. The server may execute the pseudo-random number generator to randomly select a first subset of electronic documents from the second set of electronic documents. The server may execute a comparison protocol to compare information associated with the first subset of electronic documents of the first set of electronic documents and the first subset of electronic documents of the second set of electronic documents. The comparison protocol may include a fuzzy logic comparator program. For instance, the server may use the fuzzy logic comparator program to compare the scores associated with the first subset of electronic documents of the first set of electronic documents and the scores associated with the first subset of electronic documents of the second set of electronic documents. The server may store first results of the comparison in the database.

The server may execute the pseudo-random number generator to randomly select a second subset of electronic documents from the first set of electronic documents. The server may further execute the pseudo-random number generator to randomly select a second subset of electronic documents from the second set of electronic documents. The server may execute the comparison protocol to compare the information associated with the second subset of electronic documents of the first set of electronic documents and the second subset of electronic documents of the second set of electronic documents. The server may use the fuzzy logic comparator program to compare the scores associated with the second subset of electronic documents of the first set of electronic documents and the scores associated with the second subset of electronic documents of the second set of electronic documents. The server may store second results of the comparison in the database.

In a next step 716, the server may be configured to update the graphical user interface of the client computing device with a result of the execution of the comparison protocol. The analyst may view compared scores between the first set of electronic documents and the second set of electronic documents. The analyst may determine the performance of the machine learning model based on the compared scores.

Figure 8:
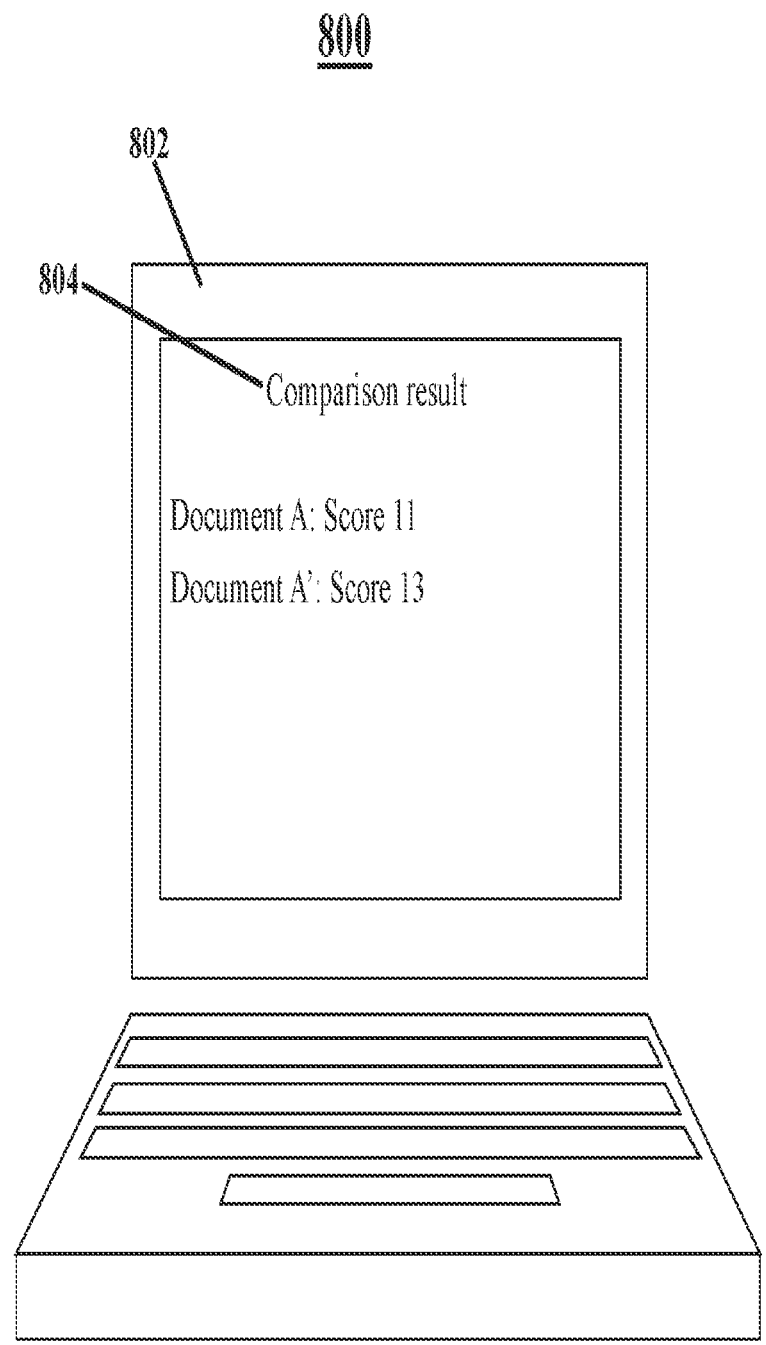
FIG. 8 shows a client computing device having a graphical user interface displaying an output, according to an embodiment.

FIG. 8 shows a client computing device 800 operated by an analyst. The client computing device 800 may include a sensor, an audio input component such as a microphone, a mechanical input component such as button or key selection sensors, a touch pad sensor, a touch-sensitive sensor, and a pointing device such as a joystick, a touch pad, a touch screen, a fingerprint sensor, or a pad for an electronic stylus. A server is coupled to a processor of the client computing device 800.

The client computing device 800 may include an output component, such as a graphical user interface 802. The graphical user interface 802 may be a cathode ray tube, a liquid crystal display, an OLED display, an AMOLED display, a super-AMOLED display, a plasma display, an incandescent light, a fluorescent light, or a projection display. The graphical user interface 802 may be a touch screen device.

In operation, the analyst may use the client computing device 800 to generate an electronic request. The server may receive the electronic request from the client computing device 800. The electronic request may be to compare a performance of an output from a machine learning model with a statistical model. The output from the machine learning model may include a first set of electronic documents (for example, document A and document B). The output from the statistical model may include a second set of electronic documents (for example, document A' and document B'). The server may execute a comparison protocol to compare scores associated with a subset of electronic documents of the first set of electronic documents with a subset of electronic documents of the second set of electronic documents. The comparison protocol may be a fuzzy logic comparator program. Upon execution of the comparison protocol, a comparison result 804 may be generated. The comparison result 804 may include an output. The output may include a comparison of the scores associated with the subset of electronic documents of the first set of electronic documents with the subset of electronic documents of the second set of electronic documents. The server may present the output of the comparison result 804 on the graphical user interface 802. The server may store the comparison result 804 in a database.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via memory sharing, message passing, token passing, network transmission, and the like.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

What is claimed is:

1. A method comprising:
   training, by a server, a machine learning model comprising a network of decision nodes using a training dataset,
   the machine learning model being configured to emulate resolution patterns corresponding to processing of one or more customer requests by one or more users, each decision node corresponding to an electronic document generated by the one or more users in response to each customer request,
   wherein the one or more users are selected from a set of users based on satisfying a performance threshold corresponding to each user's profile, and
   wherein the machine learning model is configured to output a score associated with a customer request;
   monitoring, by the server, data associated with one or more profiles corresponding to the one or more users of the training dataset;

in response to identifying a modification associated with at least one user, updating, by the server, the training dataset to include the modification;

retraining, by the server, the machine learning model using the training dataset; and comparing, by the server, performance of the machine learning model against a statistical model by comparing a first score associated with at least one customer request outputted by the machine learning model with a second score associated with the at least one customer request generated by the statistical model.

2. The method of claim 1, further comprising:

executing, by the server, a pseudo-random number generator to randomly select the at least one customer request.

3. The method of claim 1, wherein the server utilizes a fuzzy logic program to compare the machine learning model with the statistical model.

4. The method of claim 1, wherein the machine learning model is a support-vector machine supervised learning model.

5. The method of claim 1, wherein each profile associated with each user comprises an educational qualification of each user.

6. The method of claim 1, wherein each profile associated with each user comprises a number of customer requests processed by each user.

7. The method of claim 1, wherein each profile associated with each user comprises a type of customer requests processed by each user.

8. A system comprising:

a statistical model configured to analyze customer requests;

a machine learning model configured to emulate resolution patterns corresponding to processing of one or more customer requests by one or more users;

a server in communication with the statistical model and the machine learning model, the server having a processor configured to:

train the machine learning model comprising a network of decision nodes using a training dataset, each decision node corresponding to an electronic document generated by the one or more users in response to each customer request, wherein the one or more users are selected from a set of users based on satisfying a performance threshold corresponding to each user's profile, and wherein the machine learning model is configured to output a score associated with a customer request;

monitor data associated with one or more profiles corresponding to the one or more users of the training dataset;

in response to identifying a modification associated with at least one user, update the training dataset to include the modification;

retrain the machine learning model using the training dataset; and compare performance of the machine learning model against the statistical model by comparing a score associated with at least one customer request outputted by the machine learning model with a second score associated with the at least one customer request generated by the statistical model.

9. The system of claim 8, wherein the server is further configured to:

execute a pseudo-random number generator to randomly select the at least one customer request.

10. The system of claim 8, wherein the server utilizes a fuzzy logic program to compare the machine learning model with the statistical model.

11. The system of claim 8, wherein the machine learning model is a support-vector machine supervised learning model.

12. The system of claim 8, wherein each profile associated with each user comprises an educational qualification of each user.

13. The system of claim 8, wherein each profile associated with each user comprises a number of customer requests processed by each user.

14. The system of claim 8, wherein each profile associated with each user comprises a type of customer requests processed by each user.

15. A system comprising:

a non-transitory machine-readable medium having a set of instructions, that when executed by a processor, causes the processor to:

training a machine learning model comprising a network of decision nodes using a training dataset, the machine learning model being configured to emulate resolution patterns corresponding to processing of one or more customer requests by one or more users, each decision node corresponding to an electronic document generated by the one or more users in response to each customer request, wherein the one or more users are selected from a set of users based on satisfying a performance threshold corresponding to each user's profile, and wherein the machine learning model is configured to output a score associated with a customer request;

monitor data associated with one or more profiles corresponding to the one or more users of the training dataset;

in response to identifying a modification associated with at least one user, updating the training dataset to include the modification;

retrain the machine learning model using the training dataset; and compare performance of the machine learning model against a statistical model by comparing a first score associated with at least one customer request outputted by the machine learning model with a second score associated with the at least one customer request generated by the statistical model.

16. The system of claim 15, wherein the processor is further configured to execute a pseudo-random number generator to randomly select the at least one customer request.

17. The system of claim 15, wherein the server utilizes a fuzzy logic program to compare the machine learning model with the statistical model.

18. The system of claim 15, wherein the machine learning model is a support-vector machine supervised learning model.

19. The system of claim 15, wherein each profile associated with each user comprises an educational qualification of each user.

20. The system of claim 15, wherein each profile associated with each user comprises a number of customer requests processed by each user.

* * * * *